United States Patent
Madden

(10) Patent No.: US 6,345,262 B1
(45) Date of Patent: Feb. 5, 2002

(54) SYSTEM AND METHOD FOR IMPLEMENTING A MORTGAGE PLAN

(76) Inventor: Martin P. Madden, 3814 N. Alta Vista, Chicago, IL (US) 60613

(*) Notice: Subject to any disclaimer, the term of this patent is extended or adjusted under 35 U.S.C. 154(b) by 0 days.

(21) Appl. No.: 09/298,767

(22) Filed: Apr. 23, 1999

(51) Int. Cl.⁷ ............................................... G06F 17/60
(52) U.S. Cl. ......................................... 705/38; 705/35
(58) Field of Search ............................. 705/35, 36, 38

(56) References Cited

U.S. PATENT DOCUMENTS

| | | | |
|---|---|---|---|
| 4,876,648 A | * 10/1989 | Lloyd | 705/38 |
| 4,953,085 A | 8/1990 | Atkins | |
| 5,083,270 A | 1/1992 | Gross et al. | |
| 5,644,726 A | 7/1997 | Oppenheimer | |
| 5,644,727 A | * 7/1997 | Atkins | 705/38 |
| 5,673,402 A | * 9/1997 | Ryan et al. | 705/38 |
| 5,689,649 A | * 11/1997 | Altman | 705/38 |
| 5,819,230 A | 10/1998 | Christie et al. | |
| 5,832,461 A | 11/1998 | Leon et al. | |
| 5,852,811 A | 12/1998 | Atkins | |
| 5,983,206 A | * 11/1999 | Oppenheimer | 705/38 |
| 5,987,436 A | * 11/1999 | Hallbrook | 705/38 |

FOREIGN PATENT DOCUMENTS

JP 406301706 A * 10/1994

OTHER PUBLICATIONS

Iezman "The Shared Appreciation Mortgage and the Shared Equity Program"; Real Estate Review; Dialog File 15, Accession No. 00156819, Sep. 1981.*

Hughes "Money–Go–Round: Extra help for home buyers on the rack" Dialog File 15, Accession No. 00219909, Oct. 1992.*

Pasternack et al. "How to control the interest and basis problems created by the new types of mortgages". Taxations for accounts v33n6 PP: 358–362. Dialog File 15, Accession No. 00264151, Sep. 1981.*

Dennis, Marshall W., Residential Mortgage Lending, Reston Publishing, 1985, pp. 61–69.

Brueggman, William B. & Stone, Leo D. Real Estate Finance, 7th Ed. Richard D. Irwin, Inc. 1981.

* cited by examiner

Primary Examiner—Tariq R. Hafiz
Assistant Examiner—Romain Jeanty
(74) Attorney, Agent, or Firm—Niro, Scavone, Haller & Niro

(57) ABSTRACT

A system and method for implementing a mortgage plan. Data is input to a computer system regarding the mortgage terms, and the computer system is used to prepare a mortgage document which creates an equity participation mortgage obligation in which the lender shares in a predetermined percentage of realized appreciation on the subsequent sale of the asset which is the subject of the mortgage. In a particularly preferred embodiment, this mortgage plan can provide the borrower with an interest-free loan, a faster amortization schedule, and a larger, yet more affordable mortgage. The lender also receives substantial benefits, including the potential for a return which exceeds conventional mortgage rate returns, insulation from risk against interest rate fluctuation, and preferred tax treatment in the form of capital gains tax rates paid only upon the subsequent sale of the mortgaged asset. No maturity date need be specified for the mortgage; rather, it may be tied to the ultimate sale of the asset subject to the mortgage.

20 Claims, 4 Drawing Sheets

FIG. 1A

I. ORIGINATION

APPLICATION: BORROWER
↓
ORIGINATOR

UNDERWRITING ANALYSIS
- INCOME VERIFICATION
- CREDIT HISTORY
- OTHER ASSETS
- DOWN PAYMENT

REJECT     ACCEPT     INVESTORS:
                  PRICING/TERMS
       CLOSING     -MONTHLY PAYMENT
                   -AMORTIZATION PERIOD
                   -CAPPED MAXIMUM RETURN
                   -EARLY SALE CONDITIONS

INVESTOR - BORROWER:    MORTGAGE PRINCIPAL $

BORROWER - INVESTOR:    MORTGAGE
                               LOAN AGREEMENT
                               EQUITY PARTICIPATION CERTIFICATE

BORROWER - SELLER:       DOWN PAYMENT $
                               MORTGAGE PRINCIPAL $

SELLER - BORROWER        TITLE

II. AMORTIZATION PERIOD - MONTHS 1 THROUGH N
     PAYMENT(1) BORROWER→PERIODIC PRINCIPAL $--SERVICER_____INVESTOR
                 REPAYMENT     -PROCESS
                                     -CALCULATE AVG AMORT. PERIOD PRINCIPAL
                                     (TOTAL MONTHLY PRINCIPAL OUTSTANDING
                                     ÷#MONTHS SINCE ORIGINATION)

SALE:     i. DETERMINE REALIZED APPRECIATION
                        NET SALE PRICE - PURCHASE PRICE)
                  ii. CALCULATE MAXIMUM CAPPED ANNUAL RETURN
                     (E.G., AVG. AMORT. PERIOD INDEX %+___%)
                  iii. MULTIPLY (ii.) BY AVERAGE ANNUAL PRINCIPAL
                  iv. DIVIDE PROCEEDS
                     (E.G., IF X = [NET SALES RICE - PURCHASE PRICE - (iii.)] >0,
                     THEN BORROWER RETAINS X)

→FINAL PRINCIPAL PAYMENT $→SERVICER___$___INVESTOR
                                -PROCESS
                                -RECALCULATE AVG AMORTIZATION
                                   PERIOD PRINCIPAL

PAYMENT (N)

FIG. 1B

III. POST AMORTIZATION PERIOD

SALE:
    i. DETERMINE REALIZED APPRECIATION
       NET SALE PRICE - PURCHASE PRICE)
    ii. CALCULATE MAXIMUM CAPPED ANNUAL RETURN
       (E.G., AVG. AMORT. PERIOD INDEX %+___%)
    iii. MULTIPLY (ii.) BY AVERAGE ANNUAL PRINCIPAL
    iv. DIVIDE PROCEEDS
       (E.G., IF X = [NET SALES RICE - PURCHASE PRICE - (iii.)] >0,
       THEN BORROWER RETAINS X)

SYSTEM AND METHOD FOR IMPLEMENTING A MORTGAGE PLAN

BACKGROUND OF THE INVENTION

Mortgages, i.e., liens on land and improvements thereon, given as security for the payment of debts, are time-honored instruments for financing the purchase of real estate. A highly developed market exists for traditional real estate mortgages where lenders are compensated with interest on the principal amount extended. Fundamental aspects of traditional real estate mortgage lending at interest: 1) create a large prospective financial burden for borrowers in the form of total interest paid over the life of the instrument that normally exceeds the original principal extended, 2) constrain the borrowing, and ultimately, purchasing capacity of borrowers, and 3) subject lenders to risks stemming from, among other factors, variations in future interest rates. These fundamental aspects of traditional real estate mortgage lending have become firmly entrenched, with relatively little variation in the mortgage plan approach.

Nonconventional residential mortgage plans have been proposed and used, however. The most widely used nonconventional mortgage plan, perhaps, is the adjustable rate mortgage (ARM), which attempts to shift the interest rate risk to borrowers in return for providing lower initial interest rates. Other alternative instruments which have seen limited use in the past include the graduated payment mortgage (GPM), the price level adjusted mortgage (PLAM), and the shared appreciation mortgage (SAM). Each of these mortgage plans was developed to address specific problems with the vulnerability by traditional mortgage lenders to higher interest rates. The first was developed to expand the number of potential homeowners eligible for mortgage financing. This is a particular concern in inflationary times when high rates depress the borrowing capacity of potential homeowners. By skewing the payment burden toward later in the amortization period, the GPM allowed borrowers to obtain mortgage financing based on their prospects for increased future income.

The PLAM addressed the different problem of the lender's exposure to subsequent inflationary environments. Under this plan, the borrower's payments, consisting of principal and interest, varied according to fluctuations in an outside index of inflation, such as the Consumer Price Index.

The first residential SAM was offered in 1980 and required a one-third share in any appreciation of the value of the securing home in exchange for a one-third reduction in the current interest rate. SAM's had a fixed maturity date when all principal and compensation were due. They never achieved popularity for a variety of reasons, as explained in U.S. Pat. No. 5,644,726 to Oppenheimer:

> First of all, the SAM required a costly and uncertain specific house appraisal to determine the lender's share, if any, of appreciation after forced refinancing in ten years. Secondly, the homeowner had to refinance, not only the remaining mortgage principal, but original lender's share of appreciation. Finally the homeowner had no way of fixing, at the inception of the SAM mortgage, his monthly mortgage payments after the initial ten year refinancing.

(Oppenheimer, col. 2, lines 7–14).

Another example of a nonconventional mortgage is disclosed in U.S. Pat. No. 5,819,230 to Robert A. Christie, incorporated herein by reference, which references the Merrill Lynch Mortgage 100 program. There, the home buyer initially places marketable securities having a value of at least 39% of the home's purchase price in an account pledged as collateral on the mortgage loan, and appreciation of the securities over the life of the loan helps compensate for risk associated with any depreciation in home value. Similarly, U.S. Pat. No. 5,852,811 to Charles Agee Atkins discloses a mortgage plan in which money normally used to amortize the mortgage is placed into other asset accounts, so that as the home increases in value, additional loans may be made to the borrower to keep the loan-to-value ration constant at 80%.

Yet another example of a nonconventional mortgage plan approach is disclosed in the '726 Oppenheimer patent, also incorporated herein by reference. This discloses the use of a two-part principal allocation, a traditional interest bearing portion "A" and an equity portion "B", in which the principal is not repaid on portion B until portion A is completely amortized. An outside housing index is used to annually calculate the amount of equity participation to be realized by the lender at sale or maturity, regardless of changes in the actual home's value. Under this plan, the lender shares not only in the appreciation in the house above its initial purchase price, but also has a claim against the equity (above the loan balance at maturity) created by the borrower's repayment of principal. Also under this plan, there is a fixed maturity date when all principal and compensation are due.

A basic characteristic in common with all traditional and alternative mortgage instruments is that interest paid currently on outstanding principal is the dominant form of compensation to the lender. This must be the case when the two traditional sources of mortgage capital, portfolio lending by financial institutions and securitization in the secondary market, each have their own current liability finding costs to meet. This practice, as a byproduct, returns principal to the lender in a back-loaded, non-linear manner so that the average principal balance outstanding during the amortization period remains significantly above 50% of the original amount, as illustrated in FIG. 3. For instance, the midpoint in principal reduction during the amortization period of the traditional 30-year fixed rate loan in FIG. 3 is approximately 23 years.

This slow, back-loaded return of principal makes it difficult to reliably generate a sufficient return on investment where home appreciation, instead of periodic interest, is to be the dominant or sole form of compensation.

The return on a mortgage, or any investment, can be measured as:

$$\frac{\text{Average Annual Profit}}{\text{Average Annual Principal}}$$

What former mortgage plans ignore is the value of maximizing the return by manipulating the denominator, annual average principal, so that it is repaid much more rapidly, and on or near a straight line amortization basis. This can only be done by removing current interest paid on outstanding principal or making it an inconsequential component of investor compensation. When this is done, even a relatively small average annual profit generation, which would be insufficient for mortgages with back-loaded returns of principal, produces a satisfactory return.

Under existing mortgage plans, the only way to speed the return of principal to the lender is by drastically increasing the size of the monthly payment, or conversely, drastically lowering the initial mortgage principal lent. Doing so either creates an unaffordable monthly payment burden, or substantially diminishes the borrower's purchasing capacity. In either case, the principal return remains significantly backloaded and non-linear so that the average principal outstanding during the amortization period is a larger percentage of the original balance.

Currently, there is a traditional "triangular" approach to the implementation of mortgages on the lender's side, using a mortgage originator, a mortgage lender, and a servicer of the mortgage. The "originator", which may be a bank, a savings and loan/thrift institution, or a mortgage broker, initially obtains the client/borrower and also typically performs underwriting duties (e.g., verifying income, credit approvals, providing documentation at closing, including the loan agreement (the "note") and the mortgage agreement). The "lender" is the entity providing the mortgage funds, which are typically wired at closing. The "servicer" is the entity that services the mortgage during its life (e.g., periodic mortgage payments are sent by the borrower to the servicer). Those of ordinary skill in the art will understand that, within the spirit and scope of the present invention described below, this conventional triangular approach can be maintained, and may be accomplished by one single party (providing all three functions outlined in this paragraph), or either two or three parties each providing at least one of the three functions, subject to competitive and regulatory considerations.

In the past two decades within the United States, for example, relevant (e.g., U.S. Treasury) interest rates have fluctuated by as much as 10% or more, subjecting both borrowers and lenders to obvious and considerable risks. Accordingly, it would be highly advantageous to provide a new system and method for implementing a mortgage plan that can reduce lender risks associated with fluctuations in interest. It would also be advantageous to provide the lender with the potential for higher returns without unduly penalizing the lender from a tax perspective, and while also providing the borrower with incentives such as the potential for obtaining an increased mortgage which can be amortized more quickly than with conventional mortgage plans.

Accordingly, it is an object of the present invention to provide a new mortgage plan in which the lender can maximize its return while reducing lender risks associated with fluctuating interest rates.

It is another object of the present invention to reduce the amortization time period by removing current interest paid or by making it an inconsequential component of investor compensation, thus also providing the borrower with the opportunity for obtaining a larger mortgage.

SUMMARY OF THE INVENTION

These and other objects are achieved by the present invention, which preserves the advantages of existing systems and methods for implementing mortgage plans while overcoming disadvantages associated with such systems and methods, and also providing new advantages.

The invention is a system and method for implementing a mortgage plan using a computer system to provide mortgage documents which specify an amount of mortgage principal and a predetermined term for repayment of the principal, preferably with no interest. The mortgage documents also create a promissory obligation (EPMO) by the borrower, termed here "an equity participation mortgage obligation", to share with the lender a certain predetermined percentage of the realized appreciation on the subsequent sale proceeds of the mortgage asset.

In a particularly preferred embodiment of the present invention, a method is employed using a computer system for implementing a mortgage plan and preparing mortgage documents specifying payment obligations of a borrower to a lender. The mortgage plan includes an equity participation mortgage obligation. Data is first input into the computer system regarding the terms of the mortgage, including the principal amount and the amortization period. Annual average principal and periodic payment obligations of the borrower accruing under the mortgage obligation are then calculated. A mortgage document is then prepared which includes the equity participation mortgage obligation and which specifies that the lender may share in a predetermined percentage of realized appreciation on subsequent sale of the asset which is the subject of the mortgage.

In one preferred embodiment, mortgage documents are prepared which do not require the borrower to pay interest on the mortgage principal amount. Also, the mortgage documents may permit the sale of the asset in the event of a default in payments by the borrower. Further, the mortgage documents may also limit the lender's predetermined percentage of the realized appreciation on the subsequent asset sale to a specified percentage of the total realized appreciation value.

In another embodiment, a computer system may be used to calculate the average mortgage principal outstanding during the amortization period. Mortgage documents are then prepared which limit the lender's predetermined percentage of the realized appreciation on the subsequent asset sale to an amount no greater than an amount equal to a predetermined percentage annual return on the average mortgage principal outstanding during the amortization period, plus a specified percentage of the total amortization period return thereafter. The computer system may also be used to calculate a minimum total return for the lender which may exceed the predetermined percentage of realized appreciation on the subsequent sale of the asset. The mortgage documents may also specify a termination date for the mortgage which is synchronous with the sale of the asset subject to the mortgage. Similarly, the mortgage documents may specify that the repayment of any existing principal is synchronized with the sale of the asset subject to the mortgage, and/or that the payment of all obligations owed by the borrower to the lender is also synchronized with the sale of the asset subject to the mortgage.

In another embodiment, the present invention provides a computer system for implementing a mortgage plan and preparing mortgage documents specifying payment obligations of a borrower to a lender, the mortgage plan including an equity participation mortgage obligation. The computer system includes at least one computer having a central processing unit and a memory, for receiving data regarding the terms of the mortgage, including the principal amount and the amortization period. The computer calculates annual average principal and periodic payment obligations of the borrower accruing under the mortgage obligation, and prepares mortgage documents which include the equity participation mortgage obligation and which specify that the lender may share in a predetermined percentage of realized appreciation on subsequent sale of the asset which is the subject of the mortgage.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings, in which:

FIG. 1 is a schematic diagram depicting the overall system for implementing a mortgage plan according to a preferred embodiment of the present invention;

DESCRIPTION OF THE PREFERRED EMBODIMENTS

Figure 2:
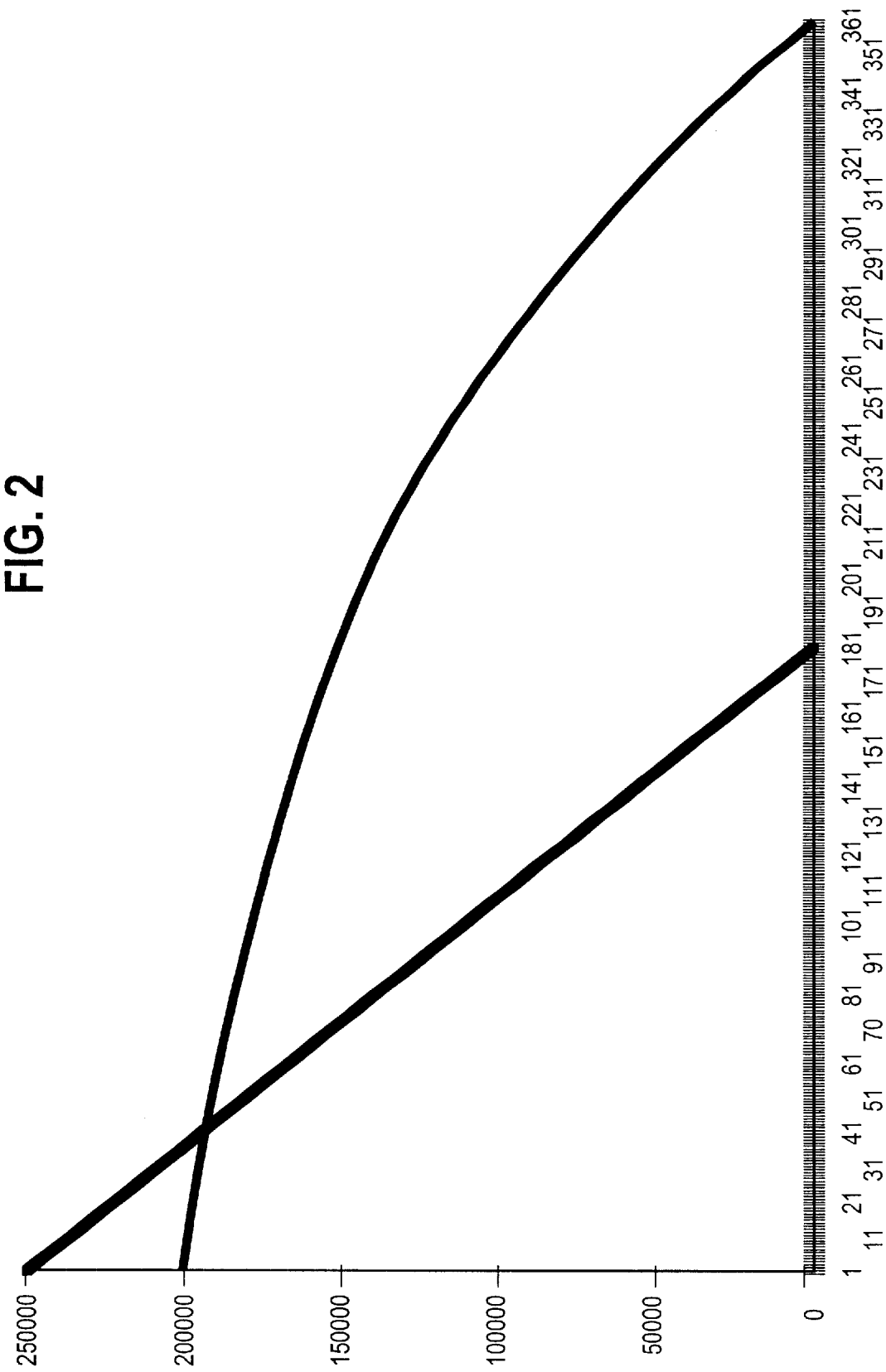
FIG. 2 is a graph of time in months (x-axis) versus principal amount (y-axis) showing typical principal pay down curves for an equity participation mortgage and a conventional mortgage plan at specified interest rates, each having the same monthly payment in dollar terms.

An explanation of a preferred embodiment of the system and method for implementing a mortgage plan using a unique mortgage instrument will now be provided by way of a specific example. Assume the initial value (termed "A") of a home is $312,500, and a 20% down payment of $62,500 is given. Thus, the initial mortgage principal amount (B) is $250,000. Assume also that the amortization period (C) is 15 years, that the required monthly mortgage payments on principal (D) are $1,367.50, and that the real estate appreciates at a compounded rate (F) of 3.5% (see, e.g., FIGS. 2–3). Assume also that the date of the subsequent sale of the house (G) is 15 years from the initial purchase price. Then, given the real estate appreciation rate F of 3.5%, after G time period of 15 years, the gross value of the home is $505,922. Ignoring sales costs, the net appreciation is then $193,402 ($505,922−$312,500), so the annual appreciation is $12,895 ($193,402/15). Also, the average principal balance over the life of the mortgage ($250,000+0)/2) is $125,000.

Using the system of the present invention, then, the EPMO permits the lender in this example to realize an average rate of return of 10.316%, which is obtained by dividing the annual appreciation of $12,895 by the average principal balance of $125,000.

Given the terms as defined in the above example, four equations can be obtained, as follows:

I. Since $A1(1+F)=A2$, and $A2(1+F)=A3$, etc., $(A1+A2+ \ldots AG)-A=W$=realized appreciation on subsequent sale of home II. $X$=yearly appreciation=$W/G$ III. $Y$=average principal balance=$B1-((D*12)+E1)=B2$, and $B2-((D*12)+E2)=B3 \ldots =(B1+B2+ \ldots BG)/G$, where E is a prepaid principal factor. (E is a factor to account for any discretionary prepayment on outstanding principal in any given payment period. Borrowers should be inclined to prepay if their means allow, since it will diminish the average annual principal outstanding from which the lender's share of appreciation will be derived.)

IV. $Z$=average annual return=$X/Y$

Figure 3:
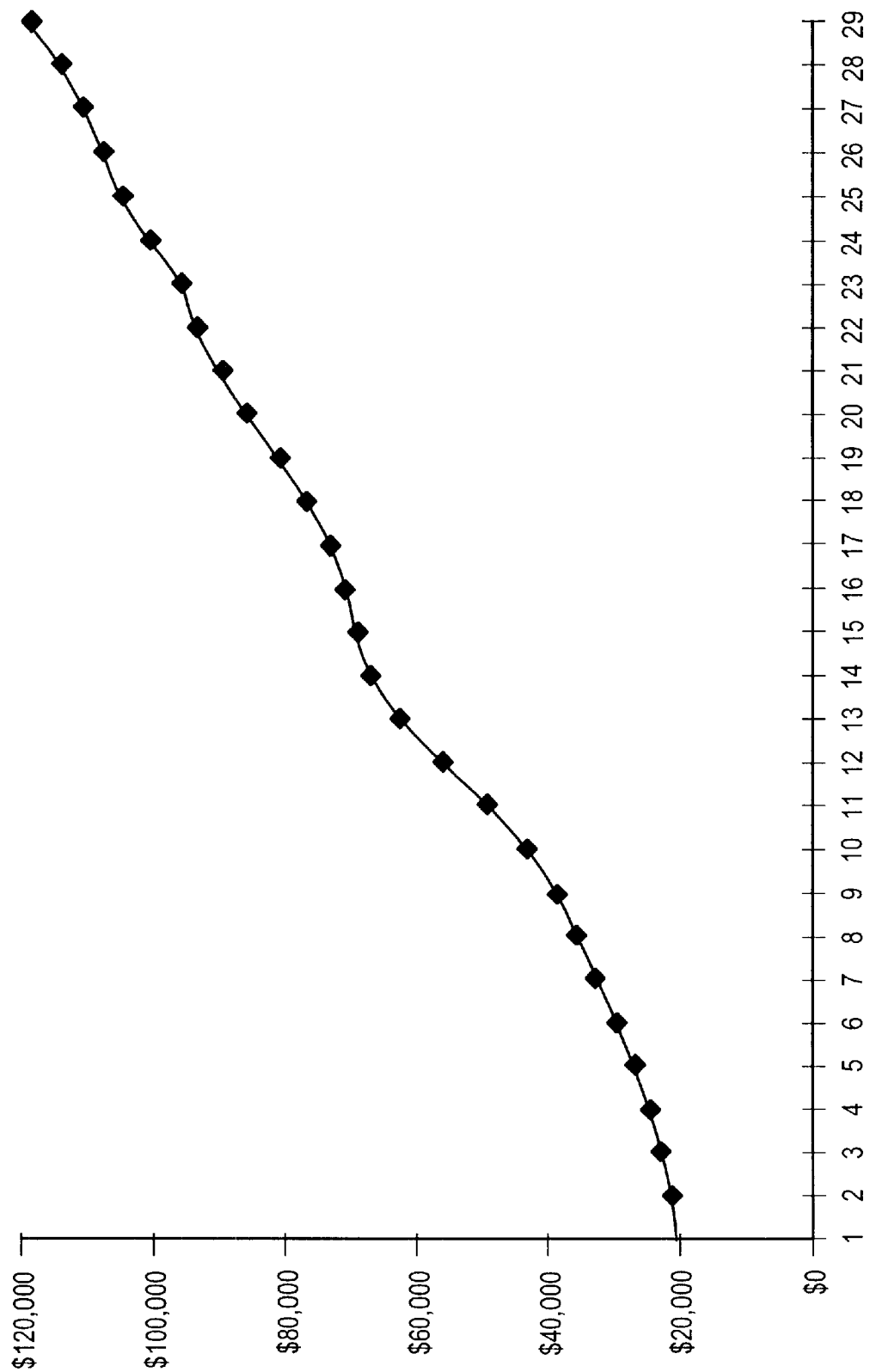
FIG. 3 is a graph of time in year (x-axis) versus annual median sales price of single family homes (y-axis).

The advantages of the mortgage instrument of the present invention over traditional mortgage instruments involving the payment of interest are several:

(1) A larger amount of debt principal is amortized more quickly, and in uniform periodic amounts, since no interest need be paid (see FIG. 3);

(2) Current income tax may not be incurred by the lender on its percentage of the realized appreciation of the real estate; capital gain tax rates (currently 20% for individual taxpayers) may be paid when the asset is ultimately sold.

(3) The borrower can assume a larger mortgage with no increased demand on current income, and thus purchase a more valuable home.

(4) The lender may obtain a higher risk-adjusted rate of return than with conventional mortgage instruments, provided the rate of appreciation of the asset remains at sufficient levels relative to the time between its purchase and sale. (Within the United States from 1968 to 1996, the median existing single-family house sales price increased from $20,100 to $118,200, an annual compound appreciation rate of 6.95%).

Comparative examples are given in Tables 1 and 2, below, of amortization schedules for a conventional 30-year fixed-interest rate mortgage (Table 1) and for an equity participation mortgage (Table 2) of the present invention; each example uses the same monthly payment to determine the original principal balances. As can be seen, the mortgage plan of the present invention significantly reduces the average life of the mortgage principal while increasing the purchasing capacity of the borrower, and providing the lender with an enhanced rate of return.

TABLE 1

Am Sched. $200k 360 Mo. 7.28%

| Pmt. # | Prin. Bal | Pmt. Amt | Int Amt | Prin Red | New Bal |
|---|---|---|---|---|---|
|  |  | $1,368.42 | 7.28% |  | $200,000.00 |
| 1 | $200,000.00 | $1,368.42 | $1,213.33 | $155.09 | $199,844.91 |
| 2 | $199,844.91 | $1,368.42 | $1,212.39 | $156.03 | $199,688.89 |
| 3 | $199,688.89 | $1,368.42 | $1,211.45 | $156.97 | $199,531.91 |
| 4 | $199,531.91 | $1,368.42 | $1,210.49 | $157.93 | $199,373.99 |
| 5 | $199,373.99 | $1,368.42 | $1,209.54 | $158.88 | $199,215.10 |
| 6 | $199,215.10 | $1,368.42 | $1,208.57 | $159.85 | $199,055.25 |
| 7 | $199,055.25 | $1,368.42 | $1,207.60 | $160.82 | $198,894.43 |
| 8 | $198,894.43 | $1,368.42 | $1,206.63 | $161.79 | $198,732.64 |
| 9 | $198,732.64 | $1,368.42 | $1,205.64 | $162.78 | $198,569.87 |
| 10 | $198,569.87 | $1,368.42 | $1,204.66 | $163.76 | $198,406.10 |
| 11 | $198,406.10 | $1,368.42 | $1,203.66 | $164.76 | $198,241.35 |
| 12 | $198,241.35 | $1,368.42 | $1,202.66 | $165.76 | $198,075.59 |
| 13 | $198,075.59 | $1,368.42 | $1,201.66 | $166.76 | $197,908.83 |
| 14 | $197,908.83 | $1,368.42 | $1,200.65 | $167.77 | $197,741.06 |
| 15 | $197,741.06 | $1,368.42 | $1,199.63 | $168.79 | $197,572.26 |
| 16 | $197,572.26 | $1,368.42 | $1,198.61 | $169.81 | $197,402.45 |
| 17 | $197,402.45 | $1,368.42 | $1,197.57 | $170.85 | $197,231.60 |
| 18 | $197,231.60 | $1,368.42 | $1,196.54 | $171.88 | $197,059.72 |
| 19 | $197,059.72 | $1,368.42 | $1,195.50 | $172.92 | $196,886.80 |
| 20 | $196,886.80 | $1,368.42 | $1,194.45 | $173.97 | $196,712.83 |
| 21 | $196,712.83 | $1,368.42 | $1,193.39 | $175.03 | $196,537.80 |
| 22 | $196,537.80 | $1,368.42 | $1,192.33 | $176.09 | $196,361.71 |
| 23 | $196,361.71 | $1,368.42 | $1,191.26 | $177.16 | $196,184.55 |
| 24 | $196,184.55 | $1,368.42 | $1,190.19 | $178.23 | $196,006.31 |
| 25 | $196,006.31 | $1,368.42 | $1,189.10 | $179.32 | $195,827.00 |
| 26 | $195,827.00 | $1,368.42 | $1,188.02 | $180.40 | $195,646.60 |
| 27 | $195,646.60 | $1,368.42 | $1,186.92 | $181.50 | $195,465.10 |
| 28 | $195,465.10 | $1,368.42 | $1,185.82 | $182.60 | $195,282.50 |
| 29 | $195,282.50 | $1,368.42 | $1,184.71 | $183.71 | $195,098.79 |
| 30 | $195,098.79 | $1,368.42 | $1,183.60 | $184.82 | $194,913.97 |
| 31 | $194,913.97 | $1,368.42 | $1,182.48 | $185.94 | $194,728.03 |
| 32 | $194,728.03 | $1,368.42 | $1,181.35 | $187.07 | $194,540.96 |
| 33 | $194,540.96 | $1,368.42 | $1,180.22 | $188.20 | $194,352.76 |
| 34 | $194,352.76 | $1,368.42 | $1,179.07 | $189.35 | $194,163.41 |
| 35 | $194,163.41 | $1,368.42 | $1,177.92 | $190.50 | $193,972.91 |
| 36 | $193,972.91 | $1,368.42 | $1,176.77 | $191.65 | $193,781.26 |
| 37 | $193,781.26 | $1,368.42 | $1,175.61 | $192.81 | $193,588.45 |
| 38 | $193,588.45 | $1,368.42 | $1,174.44 | $193.98 | $193,394.47 |
| 39 | $193,394.47 | $1,368.42 | $1,173.26 | $195.16 | $193,199.31 |
| 40 | $193,199.31 | $1,368.42 | $1,172.08 | $196.34 | $193,002.96 |
| 41 | $193,002.96 | $1,368.42 | $1,170.88 | $197.54 | $192,805.43 |
| 42 | $192,805.43 | $1,368.42 | $1,169.69 | $198.73 | $192,606.69 |
| 43 | $192,606.69 | $1,368.42 | $1,168.48 | $199.94 | $192,406.75 |
| 44 | $192,406.75 | $1,368.42 | $1,167.27 | $201.15 | $192,205.60 |
| 45 | $192,205.60 | $1,368.42 | $1,166.05 | $202.37 | $192,003.23 |
| 46 | $192,003.23 | $1,368.42 | $1,164.82 | $203.60 | $191,799.63 |
| 47 | $191,799.63 | $1,368.42 | $1,163.58 | $204.84 | $191,594.79 |
| 48 | $191,594.79 | $1,368.42 | $1,162.34 | $206.08 | $191,388.71 |
| 49 | $191,388.71 | $1,368.42 | $1,161.09 | $207.33 | $191,181.39 |
| 50 | $191,181.39 | $1,368.42 | $1,159.83 | $208.59 | $190,972.80 |
| 51 | $190,972.80 | $1,368.42 | $1,158.57 | $209.85 | $190,762.95 |

TABLE 1-continued

Am Sched. $200k 360 Mo. 7.28%

| Pmt. # | Prin. Bal | Pmt. Amt | Int Amt | Prin Red | New Bal |
|---|---|---|---|---|---|
| 52 | $190,762.95 | $1,368.42 | $1,157.30 | $211.12 | $190,551.82 |
| 53 | $190,551.82 | $1,368.42 | $1,156.01 | $212.41 | $190,339.42 |
| 54 | $190,339.42 | $1,368.42 | $1,154.73 | $213.69 | $190,125.72 |
| 55 | $190,125.72 | $1,368.42 | $1,153.43 | $214.99 | $189,910.73 |
| 56 | $189,910.73 | $1,368.42 | $1,152.13 | $216.29 | $189,694.44 |
| 57 | $189,694.44 | $1,368.42 | $1,150.81 | $217.61 | $189,476.83 |
| 58 | $189,476.83 | $1,368.42 | $1,149.49 | $218.93 | $189,257.90 |
| 59 | $189,257.90 | $1,368.42 | $1,148.16 | $220.26 | $189,037.65 |
| 60 | $189,037.65 | $1,368.42 | $1,146.83 | $221.59 | $188,816.06 |
| 61 | $188,816.06 | $1,368.42 | $1,145.48 | $222.94 | $188,593.12 |
| 62 | $188,593.12 | $1,368.42 | $1,144.13 | $224.29 | $188,368.83 |
| 63 | $188,368.83 | $1,368.42 | $1,142.77 | $225.65 | $188,143.18 |
| 64 | $188,143.18 | $1,368.42 | $1,141.40 | $227.02 | $187,916.16 |
| 65 | $187,916.16 | $1,368.42 | $1,140.02 | $228.40 | $187,687.77 |
| 66 | $187,687.77 | $1,368.42 | $1,138.64 | $229.78 | $187,457.99 |
| 67 | $187,457.99 | $1,368.42 | $1,137.25 | $231.17 | $187,226.81 |
| 68 | $187,226.81 | $1,368.42 | $1,135.84 | $232.58 | $186,994.24 |
| 69 | $186,994.24 | $1,368.42 | $1,134.43 | $233.99 | $186,760.25 |
| 70 | $186,760.25 | $1,368.42 | $1,133.01 | $235.41 | $186,524.84 |
| 71 | $186,524.84 | $1,368.42 | $1,131.58 | $236.84 | $186,288.00 |
| 72 | $186,288.00 | $1,368.42 | $1,130.15 | $238.27 | $186,049.73 |
| 73 | $186,049.73 | $1,368.42 | $1,128.70 | $239.72 | $185,810.01 |
| 74 | $185,810.01 | $1,368.42 | $1,127.25 | $241.17 | $185,568.84 |
| 75 | $185,568.84 | $1,368.42 | $1,125.78 | $242.64 | $185,326.20 |
| 76 | $185,326.20 | $1,368.42 | $1,124.31 | $244.11 | $185,082.10 |
| 77 | $185,082.10 | $1,368.42 | $1,122.83 | $245.59 | $184,836.51 |
| 78 | $184,836.51 | $1,368.42 | $1,121.34 | $247.08 | $184,589.43 |
| 79 | $184,589.43 | $1,368.42 | $1,119.84 | $248.58 | $184,340.85 |
| 80 | $184,340.85 | $1,368.42 | $1,118.33 | $250.09 | $184,090.77 |
| 81 | $184,090.77 | $1,368.42 | $1,116.82 | $251.60 | $183,839.16 |
| 82 | $183,839.16 | $1,368.42 | $1,115.29 | $253.13 | $183,586.04 |
| 83 | $183,586.04 | $1,368.42 | $1,113.76 | $254.66 | $183,331.37 |
| 84 | $183,331.37 | $1,368.42 | $1,112.21 | $256.21 | $183,075.16 |
| 85 | $183,075.16 | $1,368.42 | $1,110.66 | $257.76 | $182,817.40 |
| 86 | $182,817.40 | $1,368.42 | $1,109.09 | $259.33 | $182,558.07 |
| 87 | $182,558.07 | $1,368.42 | $1,107.52 | $260.90 | $182,297.17 |
| 88 | $182,297.17 | $1,368.42 | $1,105.94 | $262.48 | $182,034.68 |
| 89 | $182,034.68 | $1,368.42 | $1,104.34 | $264.08 | $181,770.61 |
| 90 | $181,770.61 | $1,368.42 | $1,102.74 | $265.68 | $181,504.93 |
| 91 | $181,504.93 | $1,368.42 | $1,101.13 | $267.29 | $181,237.64 |
| 92 | $181,237.64 | $1,368.42 | $1,099.51 | $268.91 | $180,968.73 |
| 93 | $180,968.73 | $1,368.42 | $1,097.88 | $270.54 | $180,698.18 |
| 94 | $180,698.18 | $1,368.42 | $1,096.24 | $272.18 | $180,426.00 |
| 95 | $180,426.00 | $1,368.42 | $1,094.58 | $273.84 | $180,152.16 |
| 96 | $180,152.16 | $1,368.42 | $1,092.92 | $275.50 | $179,876.67 |
| 97 | $179,876.67 | $1,368.42 | $1,091.25 | $277.17 | $179,599.50 |
| 98 | $179,599.50 | $1,368.42 | $1,089.57 | $278.85 | $179,320.65 |
| 99 | $179,320.65 | $1,368.42 | $1,087.88 | $280.54 | $179,040.11 |
| 100 | $179,040.11 | $1,368.42 | $1,086.18 | $282.24 | $178,757.87 |
| 101 | $178,757.87 | $1,368.42 | $1,084.46 | $283.96 | $178,473.91 |
| 102 | $178,473.91 | $1,368.42 | $1,082.74 | $285.68 | $178,188.23 |
| 103 | $178,188.23 | $1,368.42 | $1,081.01 | $287.41 | $177,900.82 |
| 104 | $177,900.82 | $1,368.42 | $1,079.26 | $289.16 | $177,611.66 |
| 105 | $177,611.66 | $1,368.42 | $1,077.51 | $290.91 | $177,320.76 |
| 106 | $177,320.76 | $1,368.42 | $1,075.75 | $292.67 | $177,028.08 |
| 107 | $177,028.08 | $1,368.42 | $1,073.97 | $294.45 | $176,733.63 |
| 108 | $176,733.63 | $1,368.42 | $1,072.18 | $296.24 | $176,437.40 |
| 109 | $176,437.40 | $1,368.42 | $1,070.39 | $298.03 | $176,139.36 |
| 110 | $176,139.36 | $1,368.42 | $1,068.58 | $299.84 | $175,839.52 |
| 111 | $175,839.52 | $1,368.42 | $1,066.76 | $301.66 | $175,537.86 |
| 112 | $175,537.86 | $1,368.42 | $1,064.93 | $303.49 | $175,234.37 |
| 113 | $175,234.37 | $1,368.42 | $1,063.09 | $305.33 | $174,929.04 |
| 114 | $174,929.04 | $1,368.42 | $1,061.24 | $307.18 | $174,621.86 |
| 115 | $174,621.86 | $1,368.42 | $1,059.37 | $309.05 | $174,312.81 |
| 116 | $174,312.81 | $1,368.42 | $1,057.50 | $310.92 | $174,001.89 |
| 117 | $174,001.89 | $1,368.42 | $1,055.61 | $312.81 | $173,689.08 |
| 118 | $173,689.08 | $1,368.42 | $1,053.71 | $314.71 | $173,374.37 |
| 119 | $173,374.37 | $1,368.42 | $1,051.80 | $316.62 | $173,057.76 |
| 120 | $173,057.76 | $1,368.42 | $1,049.88 | $318.54 | $172,739.22 |
| 121 | $172,739.22 | $1,368.42 | $1,047.95 | $320.47 | $172,418.75 |
| 122 | $172,418.75 | $1,368.42 | $1,046.01 | $322.41 | $172,096.34 |
| 123 | $172,096.34 | $1,368.42 | $1,044.05 | $324.37 | $171,771.97 |
| 124 | $171,771.97 | $1,368.42 | $1,042.08 | $326.34 | $171,445.63 |
| 125 | $171,445.63 | $1,368.42 | $1,040.10 | $328.32 | $171,117.32 |
| 126 | $171,117.32 | $1,368.42 | $1,038.11 | $330.31 | $170,787.01 |
| 127 | $170,787.01 | $1,368.42 | $1,036.11 | $332.31 | $170,454.70 |
| 128 | $170,454.70 | $1,368.42 | $1,034.09 | $334.33 | $170,120.37 |
| 129 | $170,120.37 | $1,368.42 | $1,032.06 | $336.36 | $169,784.01 |
| 130 | $169,784.01 | $1,368.42 | $1,030.02 | $338.40 | $169,445.61 |
| 131 | $169,445.61 | $1,368.42 | $1,027.97 | $340.45 | $169,105.16 |
| 132 | $169,105.16 | $1,368.42 | $1,025.90 | $342.52 | $168,762.65 |
| 133 | $168,762.65 | $1,368.42 | $1,023.83 | $344.59 | $168,418.05 |
| 134 | $168,418.05 | $1,368.42 | $1,021.74 | $346.68 | $168,071.37 |
| 135 | $168,071.37 | $1,368.42 | $1,019.63 | $348.79 | $167,722.58 |
| 136 | $167,722.58 | $1,368.42 | $1,017.52 | $350.90 | $167,371.68 |
| 137 | $167,371.68 | $1,368.42 | $1,015.39 | $353.03 | $167,018.65 |
| 138 | $167,018.65 | $1,368.42 | $1,013.25 | $355.17 | $166,663.48 |
| 139 | $166,663.48 | $1,368.42 | $1,011.09 | $357.33 | $166,306.15 |
| 140 | $166,306.15 | $1,368.42 | $1,008.92 | $359.50 | $165,946.65 |
| 141 | $165,946.65 | $1,368.42 | $1,006.74 | $361.68 | $165,584.97 |
| 142 | $165,584.97 | $1,368.42 | $1,004.55 | $363.87 | $165,221.10 |
| 143 | $165,221.10 | $1,368.42 | $1,002.34 | $366.08 | $164,855.02 |
| 144 | $164,855.02 | $1,368.42 | $1,000.12 | $368.30 | $164,486.73 |
| 145 | $164,486.73 | $1,368.42 | $997.89 | $370.53 | $164,116.19 |
| 146 | $164,116.19 | $1,368.42 | $995.64 | $372.78 | $163,743.41 |
| 147 | $163,743.41 | $1,368.42 | $993.38 | $375.04 | $163,368.37 |
| 148 | $163,368.37 | $1,368.42 | $991.10 | $377.32 | $162,991.05 |
| 149 | $162,991.05 | $1,368.42 | $988.81 | $379.61 | $162,611.44 |
| 150 | $162,611.44 | $1,368.42 | $986.51 | $381.91 | $162,229.53 |
| 151 | $162,229.53 | $1,368.42 | $984.19 | $384.23 | $161,845.30 |
| 152 | $161,845.30 | $1,368.42 | $981.86 | $386.56 | $161,458.74 |
| 153 | $161,458.74 | $1,368.42 | $979.52 | $388.90 | $161,069.84 |
| 154 | $161,069.84 | $1,368.42 | $977.16 | $391.26 | $160,678.58 |
| 155 | $160,678.58 | $1,368.42 | $974.78 | $393.64 | $160,284.94 |
| 156 | $160,284.94 | $1,368.42 | $972.40 | $396.02 | $159,888.92 |
| 157 | $159,888.92 | $1,368.42 | $969.99 | $398.43 | $159,490.49 |
| 158 | $159,490.49 | $1,368.42 | $967.58 | $400.84 | $159,089.64 |
| 159 | $159,089.64 | $1,368.42 | $965.14 | $403.28 | $158,686.37 |
| 160 | $158,686.37 | $1,368.42 | $962.70 | $405.72 | $158,280.65 |
| 161 | $158,280.65 | $1,368.42 | $960.24 | $408.18 | $157,872.46 |
| 162 | $157,872.46 | $1,368.42 | $957.76 | $410.66 | $157,461.80 |
| 163 | $157,461.80 | $1,368.42 | $955.27 | $413.15 | $157,048.65 |
| 164 | $157,048.65 | $1,368.42 | $952.76 | $415.66 | $156,632.99 |
| 165 | $156,632.99 | $1,368.42 | $950.24 | $418.18 | $156,214.81 |
| 166 | $156,214.81 | $1,368.42 | $947.70 | $420.72 | $155,794.09 |
| 167 | $155,794.09 | $1,368.42 | $945.15 | $423.27 | $155,370.82 |
| 168 | $155,370.82 | $1,368.42 | $942.58 | $425.84 | $154,944.99 |
| 169 | $154,944.99 | $1,368.42 | $940.00 | $428.42 | $154,516.57 |
| 170 | $154,516.57 | $1,368.42 | $937.40 | $431.02 | $154,085.55 |
| 171 | $154,085.55 | $1,368.42 | $934.79 | $433.63 | $153,651.91 |
| 172 | $153,651.91 | $1,368.42 | $932.15 | $436.27 | $153,215.65 |
| 173 | $153,215.65 | $1,368.42 | $929.51 | $438.91 | $152,776.74 |
| 174 | $152,776.74 | $1,368.42 | $926.85 | $441.57 | $152,335.16 |
| 175 | $152,335.16 | $1,368.42 | $924.17 | $444.25 | $151,890.91 |
| 176 | $151,890.91 | $1,368.42 | $921.47 | $446.95 | $151,443.96 |
| 177 | $151,443.96 | $1,368.42 | $918.76 | $449.66 | $150,994.30 |
| 178 | $150,994.30 | $1,368.42 | $916.03 | $452.39 | $150,541.91 |
| 179 | $150,541.91 | $1,368.42 | $913.29 | $455.13 | $150,086.78 |
| 180 | $150,086.78 | $1,368.42 | $910.53 | $457.89 | $149,628.89 |
| 181 | $149,628.89 | $1,368.42 | $907.75 | $460.67 | $149,168.22 |
| 182 | $149,168.22 | $1,368.42 | $904.95 | $463.47 | $148,704.75 |
| 183 | $148,704.75 | $1,368.42 | $902.14 | $466.28 | $148,238.47 |
| 184 | $148,238.47 | $1,368.42 | $899.31 | $469.11 | $147,769.36 |
| 185 | $147,769.36 | $1,368.42 | $896.47 | $471.95 | $147,297.41 |
| 186 | $147,297.41 | $1,368.42 | $893.60 | $474.82 | $146,822.60 |
| 187 | $146,822.60 | $1,368.42 | $890.72 | $477.70 | $146,344.90 |
| 188 | $146,344.90 | $1,368.42 | $887.83 | $480.59 | $145,864.31 |
| 189 | $145,864.31 | $1,368.42 | $884.91 | $483.51 | $145,380.80 |
| 190 | $145,380.80 | $1,368.42 | $881.98 | $486.44 | $144,894.35 |
| 191 | $144,894.35 | $1,368.42 | $879.03 | $489.39 | $144,404.96 |
| 192 | $144,404.96 | $1,368.42 | $876.06 | $492.36 | $143,912.60 |
| 193 | $143,912.60 | $1,368.42 | $873.07 | $495.35 | $143,417.25 |
| 194 | $143,417.25 | $1,368.42 | $870.06 | $498.36 | $142,918.89 |
| 195 | $142,918.89 | $1,368.42 | $867.04 | $501.38 | $142,417.51 |
| 196 | $142,417.51 | $1,368.42 | $864.00 | $504.42 | $141,913.09 |
| 197 | $141,913.09 | $1,368.42 | $860.94 | $507.48 | $141,405.61 |
| 198 | $141,405.61 | $1,368.42 | $857.86 | $510.56 | $140,895.05 |
| 199 | $140,895.05 | $1,368.42 | $854.76 | $513.66 | $140,381.39 |
| 200 | $140,381.39 | $1,368.42 | $851.65 | $516.77 | $139,864.62 |
| 201 | $139,864.62 | $1,368.42 | $848.51 | $519.91 | $139,344.71 |

TABLE 1-continued

Am Sched. $200k 360 Mo. 7.28%

| Pmt. # | Prin. Bal | Pmt. Amt | Int Amt | Prin Red | New Bal |
|---|---|---|---|---|---|
| 202 | $139,344.71 | $1,368.42 | $845.36 | $523.06 | $138,821.65 |
| 203 | $138,821.65 | $1,368.42 | $842.18 | $526.24 | $138,295.42 |
| 204 | $138,295.42 | $1,368.42 | $838.99 | $529.43 | $137,765.99 |
| 205 | $137,765.99 | $1,368.42 | $835.78 | $532.64 | $137,233.35 |
| 206 | $137,233.35 | $1,368.42 | $832.55 | $535.87 | $136,697.48 |
| 207 | $136,697.48 | $1,368.42 | $829.30 | $539.12 | $136,158.36 |
| 208 | $136,158.36 | $1,368.42 | $826.03 | $542.39 | $135,615.96 |
| 209 | $135,615.96 | $1,368.42 | $822.74 | $545.68 | $135,070.28 |
| 210 | $135,070.28 | $1,368.42 | $819.43 | $548.99 | $134,521.29 |
| 211 | $134,521.29 | $1,368.42 | $816.10 | $552.32 | $133,968.96 |
| 212 | $133,968.96 | $1,368.42 | $812.75 | $555.67 | $133,413.29 |
| 213 | $133,413.29 | $1,368.42 | $809.37 | $559.05 | $132,854.24 |
| 214 | $132,854.24 | $1,368.42 | $805.98 | $562.44 | $132,291.80 |
| 215 | $132,291.80 | $1,368.42 | $802.57 | $565.85 | $131,725.95 |
| 216 | $131,725.95 | $1,368.42 | $799.14 | $569.28 | $131,156.67 |
| 217 | $131,156.67 | $1,368.42 | $795.68 | $572.74 | $130,583.93 |
| 218 | $130,583.93 | $1,368.42 | $792.21 | $576.21 | $130,007.72 |
| 219 | $130,007.72 | $1,368.42 | $788.71 | $579.71 | $129,428.02 |
| 220 | $129,428.02 | $1,368.42 | $785.20 | $583.22 | $128,844.79 |
| 221 | $128,844.79 | $1,368.42 | $781.66 | $586.76 | $128,258.03 |
| 222 | $128,258.03 | $1,368.42 | $778.10 | $590.32 | $127,667.71 |
| 223 | $127,667.71 | $1,368.42 | $774.52 | $593.90 | $127,073.81 |
| 224 | $127,073.81 | $1,368.42 | $770.91 | $597.51 | $126,476.30 |
| 225 | $126,476.30 | $1,368.42 | $767.29 | $601.13 | $125,875.17 |
| 226 | $125,875.17 | $1,368.42 | $763.64 | $604.78 | $125,270.40 |
| 227 | $125,270.40 | $1,368.42 | $759.97 | $608.45 | $124,661.95 |
| 228 | $124,661.95 | $1,368.42 | $756.28 | $612.14 | $124,049.81 |
| 229 | $124,049.81 | $1,368.42 | $752.57 | $615.85 | $123,433.96 |
| 230 | $123,433.96 | $1,368.42 | $748.83 | $619.59 | $122,814.37 |
| 231 | $122,814.37 | $1,368.42 | $745.07 | $623.35 | $122,191.03 |
| 232 | $122,191.03 | $1,368.42 | $741.29 | $627.13 | $121,563.90 |
| 233 | $121,563.90 | $1,368.42 | $737.49 | $630.93 | $120,932.97 |
| 234 | $120,932.97 | $1,368.42 | $733.66 | $634.76 | $120,298.21 |
| 235 | $120,298.21 | $1,368.42 | $729.81 | $638.61 | $119,659.60 |
| 236 | $119,659.60 | $1,368.42 | $725.93 | $642.49 | $119,017.11 |
| 237 | $119,017.11 | $1,368.42 | $722.04 | $646.38 | $118,370.73 |
| 238 | $118,370.73 | $1,368.42 | $718.12 | $650.30 | $117,720.42 |
| 239 | $117,720.42 | $1,368.42 | $714.17 | $654.25 | $117,066.17 |
| 240 | $117,066.17 | $1,368.42 | $710.20 | $658.22 | $116,407.96 |
| 241 | $116,407.96 | $1,368.42 | $706.21 | $662.21 | $115,745.74 |
| 242 | $115,745.74 | $1,368.42 | $702.19 | $666.23 | $115,079.51 |
| 243 | $115,079.51 | $1,368.42 | $698.15 | $670.27 | $114,409.24 |
| 244 | $114,409.24 | $1,368.42 | $694.08 | $674.34 | $113,734.91 |
| 245 | $113,734.91 | $1,368.42 | $689.99 | $678.43 | $113,056.48 |
| 246 | $113,056.48 | $1,368.42 | $685.88 | $682.54 | $112,373.93 |
| 247 | $112,373.93 | $1,368.42 | $681.74 | $686.68 | $111,687.25 |
| 248 | $111,687.25 | $1,368.42 | $677.57 | $690.85 | $110,996.40 |
| 249 | $110,996.40 | $1,368.42 | $673.38 | $695.04 | $110,301.36 |
| 250 | $110,301.36 | $1,368.42 | $669.16 | $699.26 | $109,602.10 |
| 251 | $109,602.10 | $1,368.42 | $664.92 | $703.50 | $108,898.60 |
| 252 | $108,898.60 | $1,368.42 | $660.65 | $707.77 | $108,190.83 |
| 253 | $108,190.83 | $1,368.42 | $656.36 | $712.06 | $107,478.77 |
| 254 | $107,478.77 | $1,368.42 | $652.04 | $716.38 | $106,762.38 |
| 255 | $106,762.38 | $1,368.42 | $647.69 | $720.73 | $106,041.66 |
| 256 | $106,041.66 | $1,368.42 | $643.32 | $725.10 | $105,316.56 |
| 257 | $105,316.56 | $1,368.42 | $638.92 | $729.50 | $104,587.06 |
| 258 | $104,587.06 | $1,368.42 | $634.49 | $733.93 | $103,853.13 |
| 259 | $103,853.13 | $1,368.42 | $630.04 | $738.38 | $103,114.75 |
| 260 | $103,114.75 | $1,368.42 | $625.56 | $742.86 | $102,371.90 |
| 261 | $102,371.90 | $1,368.42 | $621.06 | $747.36 | $101,624.53 |
| 262 | $101,624.53 | $1,368.42 | $616.52 | $751.90 | $100,872.63 |
| 263 | $100,872.63 | $1,368.42 | $611.96 | $756.46 | $100,116.18 |
| 264 | $100,116.18 | $1,368.42 | $607.37 | $761.05 | $99,355.13 |
| 265 | $99,355.13 | $1,368.42 | $602.75 | $765.67 | $98,589.46 |
| 266 | $98,589.46 | $1,368.42 | $598.11 | $770.31 | $97,819.15 |
| 267 | $97,819.15 | $1,368.42 | $593.44 | $774.98 | $97,044.17 |
| 268 | $97,044.17 | $1,368.42 | $588.73 | $779.69 | $96,264.48 |
| 269 | $96,264.48 | $1,368.42 | $584.00 | $784.42 | $95,480.07 |
| 270 | $95,480.07 | $1,368.42 | $579.25 | $789.17 | $94,690.89 |
| 271 | $94,690.89 | $1,368.42 | $574.46 | $793.96 | $93,896.93 |
| 272 | $93,896.93 | $1,368.42 | $569.64 | $798.78 | $93,098.15 |
| 273 | $93,098.15 | $1,368.42 | $564.80 | $803.62 | $92,294.53 |
| 274 | $92,294.53 | $1,368.42 | $559.92 | $808.50 | $91,486.03 |
| 275 | $91,486.03 | $1,368.42 | $555.02 | $813.40 | $90,672.62 |
| 276 | $90,672.62 | $1,368.42 | $550.08 | $818.34 | $89,854.28 |
| 277 | $89,854.28 | $1,368.42 | $545.12 | $823.30 | $89,030.98 |
| 278 | $89,030.98 | $1,368.42 | $540.12 | $828.30 | $88,202.68 |
| 279 | $88,202.68 | $1,368.42 | $535.10 | $833.32 | $87,369.36 |
| 280 | $87,369.36 | $1,368.42 | $530.04 | $838.38 | $86,530.98 |
| 281 | $86,530.98 | $1,368.42 | $524.95 | $843.47 | $85,687.51 |
| 282 | $85,687.51 | $1,368.42 | $519.84 | $848.58 | $84,838.93 |
| 283 | $84,838.93 | $1,368.42 | $514.69 | $853.73 | $83,985.20 |
| 284 | $83,985.20 | $1,368.42 | $509.51 | $858.91 | $83,126.29 |
| 285 | $83,126.29 | $1,368.42 | $504.30 | $864.12 | $82,262.17 |
| 286 | $82,262.17 | $1,368.42 | $499.06 | $869.36 | $81,392.81 |
| 287 | $81,392.81 | $1,368.42 | $493.78 | $874.64 | $80,518.17 |
| 288 | $80,518.17 | $1,368.42 | $488.48 | $879.94 | $79,638.23 |
| 289 | $79,638.23 | $1,368.42 | $483.14 | $885.28 | $78,752.94 |
| 290 | $78,752.94 | $1,368.42 | $477.77 | $890.65 | $77,862.29 |
| 291 | $77,862.29 | $1,368.42 | $472.36 | $896.06 | $76,966.24 |
| 292 | $76,966.24 | $1,368.42 | $466.93 | $901.49 | $76,064.74 |
| 293 | $76,064.74 | $1,368.42 | $461.46 | $906.96 | $75,157.78 |
| 294 | $75,157.78 | $1,368.42 | $455.96 | $912.46 | $74,245.32 |
| 295 | $74,245.32 | $1,368.42 | $450.42 | $918.00 | $73,327.32 |
| 296 | $73,327.32 | $1,368.42 | $444.85 | $923.57 | $72,403.76 |
| 297 | $72,403.76 | $1,368.42 | $439.25 | $929.17 | $71,474.58 |
| 298 | $71,474.58 | $1,368.42 | $433.61 | $934.81 | $70,539.78 |
| 299 | $70,539.78 | $1,368.42 | $427.94 | $940.48 | $69,599.30 |
| 300 | $69,599.30 | $1,368.42 | $422.24 | $946.18 | $68,653.11 |
| 301 | $68,653.11 | $1,368.42 | $416.50 | $951.92 | $67,701.19 |
| 302 | $67,701.19 | $1,368.42 | $410.72 | $957.70 | $66,743.49 |
| 303 | $66,743.49 | $1,368.42 | $404.91 | $963.51 | $65,779.98 |
| 304 | $65,779.98 | $1,368.42 | $399.07 | $969.35 | $64,810.63 |
| 305 | $64,810.63 | $1,368.42 | $393.18 | $975.24 | $63,835.39 |
| 306 | $63,835.39 | $1,368.42 | $387.27 | $981.15 | $62,854.24 |
| 307 | $62,854.24 | $1,368.42 | $381.32 | $987.10 | $61,867.13 |
| 308 | $61,867.13 | $1,368.42 | $375.33 | $993.09 | $60,874.04 |
| 309 | $60,874.04 | $1,368.42 | $369.30 | $999.12 | $59,874.92 |
| 310 | $59,874.92 | $1,368.42 | $363.24 | $1,005.18 | $58,869.75 |
| 311 | $58,869.75 | $1,368.42 | $357.14 | $1,011.28 | $57,858.47 |
| 312 | $57,858.47 | $1,368.42 | $351.01 | $1,017.41 | $56,841.06 |
| 313 | $56,841.06 | $1,368.42 | $344.84 | $1,023.58 | $55,817.47 |
| 314 | $55,817.47 | $1,368.42 | $338.63 | $1,029.79 | $54,787.68 |
| 315 | $54,787.68 | $1,368.42 | $332.38 | $1,036.04 | $53,751.64 |
| 316 | $53,751.64 | $1,368.42 | $326.09 | $1,042.33 | $52,709.31 |
| 317 | $52,709.31 | $1,368.42 | $319.77 | $1,048.65 | $51,660.66 |
| 318 | $51,660.66 | $1,368.42 | $313.41 | $1,055.01 | $50,605.65 |
| 319 | $50,605.65 | $1,368.42 | $307.01 | $1,061.41 | $49,544.24 |
| 320 | $49,544.24 | $1,368.42 | $300.57 | $1,067.85 | $48,476.38 |
| 321 | $48,476.38 | $1,368.42 | $294.09 | $1,074.33 | $47,402.05 |
| 322 | $47,402.05 | $1,368.42 | $287.57 | $1,080.85 | $46,321.21 |
| 323 | $46,321.21 | $1,368.42 | $281.02 | $1,087.40 | $45,233.80 |
| 324 | $45,233.80 | $1,368.42 | $274.42 | $1,094.00 | $44,139.80 |
| 325 | $44,139.80 | $1,368.42 | $267.78 | $1,100.64 | $43,039.16 |
| 326 | $43,039.16 | $1,368.42 | $261.10 | $1,107.32 | $41,931.85 |
| 327 | $41,931.85 | $1,368.42 | $254.39 | $1,114.03 | $40,817.81 |
| 328 | $40,817.81 | $1,368.42 | $247.63 | $1,120.79 | $39,697.02 |
| 329 | $39,697.02 | $1,368.42 | $240.83 | $1,127.59 | $38,569.43 |
| 330 | $38,569.43 | $1,368.42 | $233.99 | $1,134.43 | $37,435.00 |
| 331 | $37,435.00 | $1,368.42 | $227.11 | $1,141.31 | $36,293.68 |
| 332 | $36,293.68 | $1,368.42 | $220.18 | $1,148.24 | $35,145.44 |
| 333 | $35,145.44 | $1,368.42 | $213.22 | $1,155.20 | $33,990.24 |
| 334 | $33,990.24 | $1,368.42 | $206.21 | $1,162.21 | $32,828.03 |
| 335 | $32,828.03 | $1,368.42 | $199.16 | $1,169.26 | $31,658.76 |
| 336 | $31,658.76 | $1,368.42 | $192.06 | $1,176.36 | $30,482.41 |
| 337 | $30,482.41 | $1,368.42 | $184.93 | $1,183.49 | $29,298.91 |
| 338 | $29,298.91 | $1,368.42 | $177.75 | $1,190.67 | $28,108.24 |
| 339 | $28,108.24 | $1,368.42 | $170.52 | $1,197.90 | $26,910.34 |
| 340 | $26,910.34 | $1,368.42 | $163.26 | $1,205.16 | $25,705.18 |
| 341 | $25,705.18 | $1,368.42 | $155.94 | $1,212.48 | $24,492.70 |
| 342 | $24,492.70 | $1,368.42 | $148.59 | $1,219.83 | $23,272.87 |
| 343 | $23,272.87 | $1,368.42 | $141.19 | $1,227.23 | $22,045.64 |
| 344 | $22,045.64 | $1,368.42 | $133.74 | $1,234.68 | $20,810.97 |
| 345 | $20,810.97 | $1,368.42 | $126.25 | $1,242.17 | $19,568.80 |
| 346 | $19,568.80 | $1,368.42 | $118.72 | $1,249.70 | $18,319.10 |
| 347 | $18,319.10 | $1,368.42 | $111.14 | $1,257.28 | $17,061.81 |
| 348 | $17,061.81 | $1,368.42 | $103.51 | $1,264.91 | $15,796.90 |
| 349 | $15,796.90 | $1,368.42 | $95.83 | $1,272.59 | $14,524.32 |
| 350 | $14,524.32 | $1,368.42 | $88.11 | $1,280.31 | $13,244.01 |
| 351 | $13,244.01 | $1,368.42 | $80.35 | $1,288.07 | $11,955.94 |

TABLE 1-continued

Am Sched. $200k 360 Mo. 7.28%

| Pmt. # | Prin. Bal | Pmt. Amt | Int Amt | Prin Red | New Bal |
|---|---|---|---|---|---|
| 352 | $11,955.94 | $1,368.42 | $72.53 | $1,295.89 | $10,660.05 |
| 353 | $10,660.05 | $1,368.42 | $64.67 | $1,303.75 | $9,356.30 |
| 354 | $9,356.30 | $1,368.42 | $56.76 | $1,311.66 | $8,044.64 |
| 355 | $8,044.64 | $1,368.42 | $48.80 | $1,319.62 | $6,725.03 |
| 356 | $6,725.03 | $1,368.42 | $40.80 | $1,327.62 | $5,397.40 |
| 357 | $5,397.40 | $1,368.42 | $32.74 | $1,335.68 | $4,061.73 |
| 358 | $4,061.73 | $1,368.42 | $24.64 | $1,343.78 | $2,717.95 |
| 359 | $2,717.95 | $1,368.42 | $16.49 | $1,351.93 | $1,366.02 |
| 360 | $1,366.02 | $1,374.31 | $8.29 | $1,366.02 | ($0.00) |

TABLE 2

Sheet 1

| Month | Home Value | Mortgage Principal | Monthly Payment | % Change in Home Value |
|---|---|---|---|---|
| 1 | 240,000 | 200,000 | 1,367.75 | |
| 2 | 240,000 | 198,632 | 1,367.75 | |
| 3 | 240,000 | 197,265 | 1,367.75 | |
| 4 | 240,000 | 195,897 | 1,367.75 | |
| 5 | 240,000 | 194,529 | 1,367.75 | |
| 6 | 240,000 | 193,161 | 1,367.75 | |
| 7 | 240,000 | 191,794 | 1,367.75 | |
| 8 | 240,000 | 190,426 | 1,367.75 | |
| 9 | 240,000 | 189,058 | 1,367.75 | |
| 10 | 240,000 | 187,690 | 1,367.75 | |
| 11 | 240,000 | 186,323 | 1,367.75 | |
| 12 | 248,400 | 184,955 | 1,367.75 | 3.50% |
| 13 | 248,400 | 183,587 | 1,367.75 | |
| 14 | 248,400 | 182,219 | 1,367.75 | |
| 15 | 248,400 | 180,852 | 1,367.75 | |
| 16 | 248,400 | 179,484 | 1,367.75 | |
| 17 | 248,400 | 178,116 | 1,367.75 | |
| 18 | 248,400 | 176,748 | 1,367.75 | |
| 19 | 248,400 | 175,381 | 1,367.75 | |
| 20 | 248,400 | 174,013 | 1,367.75 | |
| 21 | 248,400 | 172,645 | 1,367.75 | |
| 22 | 248,400 | 171,277 | 1,367.75 | |
| 23 | 248,400 | 169,910 | 1,367.75 | |
| 24 | 257,094 | 168,542 | 1,367.75 | 3.50% |
| 25 | 257,094 | 167,174 | 1,367.75 | |
| 26 | 257,094 | 165,806 | 1,367.75 | |
| 27 | 257,094 | 164,439 | 1,367.75 | |
| 28 | 257,094 | 163,071 | 1,367.75 | |
| 29 | 257,094 | 161,703 | 1,367.75 | |
| 30 | 257,094 | 160,335 | 1,367.75 | |
| 31 | 257,094 | 158,968 | 1,367.75 | |
| 32 | 257,094 | 157,600 | 1,367.75 | |
| 33 | 257,094 | 156,232 | 1,367.75 | |
| 34 | 257,094 | 154,864 | 1,367.75 | |
| 35 | 257,094 | 153,497 | 1,367.75 | |
| 36 | 266,092 | 152,129 | 1,367.75 | 3.50% |
| 37 | 266,092 | 150,761 | 1,367.75 | |
| 38 | 266,092 | 149,393 | 1,367.75 | |
| 39 | 266,092 | 148,026 | 1,367.75 | |
| 40 | 266,092 | 146,658 | 1,367.75 | |
| 41 | 266,092 | 145,290 | 1,367.75 | |
| 42 | 266,092 | 143,922 | 1,367.75 | |
| 43 | 266,092 | 142,555 | 1,367.75 | |
| 44 | 266,092 | 141,187 | 1,367.75 | |
| 45 | 266,092 | 139,819 | 1,367.75 | |
| 46 | 266,092 | 138,451 | 1,367.75 | |
| 47 | 266,092 | 137,084 | 1,367.75 | |
| 48 | 275,406 | 135,716 | 1,367.75 | 3.50% |
| 49 | 275,406 | 134,348 | 1,367.75 | |
| 50 | 275,406 | 132,980 | 1,367.75 | |
| 51 | 275,406 | 131,613 | 1,367.75 | |
| 52 | 275,406 | 130,245 | 1,367.75 | |
| 53 | 275,406 | 128,877 | 1,367.75 | |
| 54 | 275,406 | 127,509 | 1,367.75 | |
| 55 | 275,406 | 126,142 | 1,367.75 | |

TABLE 2-continued

Sheet 1

| Month | Home Value | Mortgage Principal | Monthly Payment | % Change in Home Value |
|---|---|---|---|---|
| 56 | 275,406 | 124,774 | 1,367.75 | |
| 57 | 275,406 | 123,406 | 1,367.75 | |
| 58 | 275,406 | 122,038 | 1,367.75 | |
| 59 | 275,406 | 120,671 | 1,367.75 | |
| 60 | 285,045 | 119,303 | 1,367.75 | 3.50% |
| 61 | 285,045 | 117,935 | 1,367.75 | |
| 62 | 285,045 | 116,567 | 1,367.75 | |
| 63 | 285,045 | 115,200 | 1,367.75 | |
| 64 | 285,045 | 113,832 | 1,367.75 | |
| 65 | 285,045 | 112,464 | 1,367.75 | |
| 66 | 285,045 | 111,096 | 1,367.75 | |
| 67 | 285,045 | 109,729 | 1,367.75 | |
| 68 | 285,045 | 108,361 | 1,367.75 | |
| 69 | 285,045 | 106,993 | 1,367.75 | |
| 70 | 285,045 | 105,625 | 1,367.75 | |
| 71 | 285,045 | 104,258 | 1,367.75 | |
| 72 | 295,021 | 102,890 | 1,367.75 | 3.50% |
| 73 | 295,021 | 101,522 | 1,367.75 | |
| 74 | 295,021 | 100,154 | 1,367.75 | |
| 75 | 295,021 | 98,787 | 1,367.75 | |
| 76 | 295,021 | 97,419 | 1,367.75 | |
| 77 | 295,021 | 96,051 | 1,367.75 | |
| 78 | 295,021 | 94,683 | 1,367.75 | |
| 79 | 295,021 | 93,316 | 1,367.75 | |
| 80 | 295,021 | 91,948 | 1,367.75 | |
| 81 | 295,021 | 90,580 | 1,367.75 | |
| 82 | 295,021 | 89,212 | 1,367.75 | |
| 83 | 295,021 | 87,845 | 1,367.75 | |
| 84 | 305,347 | 86,477 | 1,367.75 | 3.50% |
| 85 | 305,347 | 85,109 | 1,367.75 | |
| 86 | 305,347 | 83,741 | 1,367.75 | |
| 87 | 305,347 | 82,374 | 1,367.75 | |
| 88 | 305,347 | 81,006 | 1,367.75 | |
| 89 | 305,347 | 79,638 | 1,367.75 | |
| 90 | 305,347 | 78,270 | 1,367.75 | |
| 91 | 305,347 | 76,903 | 1,367.75 | |
| 92 | 305,347 | 75,535 | 1,367.75 | |
| 93 | 305,347 | 74,167 | 1,367.75 | |
| 94 | 305,347 | 72,799 | 1,367.75 | |
| 95 | 305,347 | 71,432 | 1,367.75 | |
| 96 | 316,034 | 70,064 | 1,367.75 | 3.50% |
| 97 | 316,034 | 68,696 | 1,367.75 | |
| 98 | 316,034 | 67,328 | 1,367.75 | |
| 99 | 316,034 | 65,961 | 1,367.75 | |
| 100 | 316,034 | 64,593 | 1,367.75 | |
| 101 | 316,034 | 63,225 | 1,367.75 | |
| 102 | 316,034 | 61,857 | 1,367.75 | |
| 103 | 316,034 | 60,490 | 1,367.75 | |
| 104 | 316,034 | 59,122 | 1,367.75 | |
| 105 | 316,034 | 57,754 | 1,367.75 | |
| 106 | 316,034 | 56,386 | 1,367.75 | |
| 107 | 316,034 | 55,019 | 1,367.75 | |
| 108 | 327,095 | 53,651 | 1,367.75 | 3.50% |
| 109 | 327,095 | 52,283 | 1,367.75 | |
| 110 | 327,095 | 50,915 | 1,367.75 | |
| 111 | 327,095 | 49,548 | 1,367.75 | |
| 112 | 327,095 | 48,180 | 1,367.75 | |
| 113 | 327,095 | 46,812 | 1,367.75 | |
| 114 | 327,095 | 45,444 | 1,367.75 | |
| 115 | 327,095 | 44,077 | 1,367.75 | |
| 116 | 327,095 | 42,709 | 1,367.75 | |
| 117 | 327,095 | 41,341 | 1,367.75 | |
| 118 | 327,095 | 39,973 | 1,367.75 | |
| 119 | 327,095 | 38,606 | 1,367.75 | |
| 120 | 338,544 | 37,238 | 1,367.75 | 3.50% |
| 121 | 338,544 | 35,870 | 1,367.75 | |
| 122 | 338,544 | 34,502 | 1,367.75 | |
| 123 | 338,544 | 33,135 | 1,367.75 | |
| 124 | 338,544 | 31,767 | 1,367.75 | |
| 125 | 338,544 | 30,399 | 1,367.75 | |
| 126 | 338,544 | 29,031 | 1,367.75 | |
| 127 | 338,544 | 27,664 | 1,367.75 | |
| 128 | 338,544 | 26,296 | 1,367.75 | |
| 129 | 338,544 | 24,928 | 1,367.75 | |

TABLE 2-continued

Sheet 1

| Month | Home Value | Mortgage Principal | Monthly Payment | % Change in Home Value |
|---|---|---|---|---|
| 130 | 338,544 | 23,560 | 1,367.75 | |
| 131 | 338,544 | 22,193 | 1,367.75 | |
| 132 | 350,393 | 20,825 | 1,367.75 | 3.50% |
| 133 | 350,393 | 19,457 | 1,367.75 | |
| 134 | 350,393 | 18,089 | 1,367.75 | |
| 135 | 350,393 | 16,722 | 1,367.75 | |
| 136 | 350,393 | 15,354 | 1,367.75 | |
| 137 | 350,393 | 13,986 | 1,367.75 | |
| 138 | 350,393 | 12,618 | 1,367.75 | |
| 139 | 350,393 | 11,251 | 1,367.75 | |
| 140 | 350,393 | 9,883 | 1,367.75 | |
| 141 | 350,393 | 8,515 | 1,367.75 | |
| 142 | 350,393 | 7,147 | 1,367.75 | |
| 143 | 350,393 | 5,780 | 1,367.75 | |
| 144 | 362,656 | 4,412 | 1,367.75 | 3.50% |
| 145 | 362,656 | 3,044 | 1,367.75 | |
| 146 | 362,656 | 1,676 | 1,367.75 | |
| 147 | 362,656 | 309 | 1,367.75 | |
| 148 | 362,656 | — | 308.50 | |
| 149 | | | | |
| 150 | | | | |
| 151 | | | | |
| 152 | | | | |
| 153 | | | | |
| 154 | | | | |
| 155 | | | | |
| 156 | | | | |
| 157 | | | | |
| 158 | | | | |
| 159 | | | | |
| 160 | | | | |
| 161 | | | | |
| 162 | | | | |
| 163 | | | | |
| 164 | | | | |
| 165 | | | | |
| 166 | | | | |
| 167 | | | | |
| 168 | | | | |
| 169 | | | | |
| 170 | | | | |
| 171 | | | | |
| 172 | | | | |
| 173 | | | | |
| 174 | | | | |
| 175 | | | | |
| 176 | | | | |
| 177 | | | | |
| 178 | | | | |
| 179 | | | | |
| 180 | | | | |
| 181 | | | | |
| 182 | | | | |
| 183 | | | | |
| 184 | | | | |
| 185 | | | | |
| 186 | | | | |
| 187 | | | | |
| 188 | | | | |
| 189 | | | | |
| 190 | | | | |
| 191 | | | | |
| 192 | | | | |
| 193 | | | | |
| 194 | | | | |
| 195 | | | | |

In one preferred embodiment, the mortgage plan penalizes the borrower for an early sale of the asset. In one example, this penalty is the forfeiture of some percentage of the down payment, figured on a declining scale over the first ten years of the mortgage.

A cap may be placed on the amount which the lender can realize from appreciated earnings on the sale of the asset. In one preferred embodiment, the lender's share of the real estate's realized appreciated value may be limited to: (1) a specified percentage of the total realized appreciation value; or (2) no greater than an average annual return equal to a certain percent above the average fed funds rate throughout the amortization period on the average mortgage principal outstanding during the amortization period ("the Amortization Period Return") plus, if the property has not yet been sold, a certain percent (annually compounded) of the total amortization period return thereafter ("the Post-Amortization Period Return"); or (3) the lesser of (1) or (2). The use of a cap can avoid what may be viewed as a windfall result for the lender when, e.g., the borrower retains the asset for a substantial time period and the rate of appreciation of the asset is extremely high over that period.

In another preferred embodiment the mortgage documents could include a "non-maturity" clause that would synchronize the end of the mortgage, the repayment of remaining principal (if any), and the payment of the investor's compensation (the predetermined amortization period return, plus the post-amortization period return) with the ultimate sale of the real estate. This will further strengthen the deferred tax treatment of the investment as an equity investment taxed at a gain, rather than as a debt investment. Also, the lack of a fixed maturity date should not be viewed as a negative for the investor, since it is believed that the potential for a secondary market for these instruments exists which will enable the investor to liquidate its position by selling the instrument to a third party.

Those of ordinary skill in the art will recognize that certain contractual provisions may need to be provided in the mortgage documents to ensure that borrowers have sufficient incentive to maintain the real estate subject to the mortgage, and to prevent borrowers from circumventing or minimizing their obligation to share appreciation with investors.

Of course, it should be understood that various changes and modifications to the preferred embodiments described herein will be apparent to those skilled in the art. Other changes and modifications constituting insubstantial differences from the present invention, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

I claim:

1. A method of using a computer system for implementing a mortgage plan and preparing mortgage documents specifying payment obligations of a borrower to a lender concerning an asset which is subject to a mortgage, the mortgage plan including an equity participation mortgage obligation, comprising the steps of:

inputting data into the computer system regarding the terms of the mortgage, including the principal amount and an amortization period;

using the computer system to calculate annual average principal and periodic payment obligations of the borrower accruing under the mortgage obligation; and using the computer system to prepare one or more mortgage documents which specify: (1) the equity participation mortgage obligation; (2) that the lender may only share in a predetermined percentage of realized appreciation on subsequent sale of the asset which is the subject of the mortgage; (3) that timing of equity participation with the lender is indeterminable, occurs prior to the maturity date, and is controlled by the borrower; and (4) that the borrower is not required to pay interest on the mortgage principal amount.

2. The method of claim 1, further comprising the step of preparing mortgage documents which permit the lender to require the sale of the asset in the event of a default in payments by the borrower.

3. The method of claim 1, further comprising the step of preparing mortgage documents which limit the lender's predetermined percentage of the realized appreciation on the subsequent asset sale to a specified percentage of the total realized appreciation value.

4. The method of claim 1, further comprising the steps of:
using the computer system to calculate the average mortgage principal outstanding during the amortization period; and
using the computer system to prepare mortgage documents which limit the lender's predetermined percentage of the realized appreciation on the subsequent asset sale to an amount no greater than an amount equal to a predetermined percentage annual return on the average mortgage principal outstanding during the amortization period, plus a specified percentage of the total amortization period return thereafter.

5. The method of claim 1, further comprising the step of using the computer system to calculate a minimum total return for the lender which may exceed the predetermined percentage of realized appreciation on the subsequent sale of the asset.

6. The method of claim 1, wherein the one or more mortgage documents specify a termination date for the mortgage which is synchronous with the sale of the asset subject to the mortgage.

7. The method of claim 1, wherein the one or more mortgage documents specify that repayment of any existing principal is synchronized with the sale of the asset subject to the mortgage.

8. The method of claim 1, wherein the one or more mortgage documents specify that payment of all obligations owed by the borrower to the lender is synchronized with the sale of the asset subject to the mortgage.

9. A computer system for implementing a mortgage plan and preparing mortgage documents specifying payment obligations of a borrower to a lender concerning an asset which is subject to a mortgage, the mortgage plan including an equity participation mortgage obligation, comprising:
at least one computer including a central processing unit and a memory, for receiving data regarding the terms of the mortgage, including the principal amount and an amortization period, within the computer system;
the at least one computer calculating annual average principal and periodic payment obligations of the borrower accruing under the mortgage obligation, and preparing one or more mortgage documents which include the equity participation mortgage obligation and which specify: (1) that the lender may share in a predetermined percentage of realized appreciation only on subsequent sale of the asset which is subject to the mortgage; (2) that timing of equity participation with the lender is indeterminable, occurs prior to the maturity date, and is controlled by the borrower; and (3) that the borrower is not required to pay interest on the mortgage principal amount.

10. A method of using a computer system for implementing a mortgage plan and or preparing one or more mortgage documents specifying payment obligations of a borrower to a lender concerning an asset which is subject to a mortgage having a maturity date, the mortgage plan specifying an equity participation mortgage obligation in which the lender receives a predetermined portion of realized appreciation in the asset during the life of the mortgage, comprising the steps of:
inputting data into the computer system regarding the terms of the mortgage, including the principal amount and an amortization period;
calculating annual average principal and periodic payment obligations of the borrower accruing under the mortgage obligation; and
preparing the one or more mortgage documents, the one or more mortgage documents specifying: the equity participation mortgage obligation; that the lender shares in a predetermined percentage of the realized appreciation on subsequent sale of the asset which is the subject of the mortgage; that timing of equity participation with the lender is indeterminable, occurs prior to the maturity date, and is controlled by the borrower; and that prior to sale or maturity of the asset, the amount of principal paid by the borrower pursuant to the mortgage exceeds the amount of current interest paid by the borrower.

11. The method of claim 10, wherein the one or more mortgage documents also specify that the borrower incurs a financial penalty for an early sale of the asset.

12. The method of claim 11, wherein the mortgage terms include a down payment by the borrower, and wherein the penalty is the forfeiture of a predetermined percentage of the down payment.

13. The method of claim 11, wherein the penalty continuously declines over a predetermined initial term of the mortgage.

14. The method of claim 10, wherein the one or more mortgage documents also specify a termination date for the mortgage which is synchronous with the sale of the asset subject to the mortgage.

15. The method of claim 10, wherein the one or more mortgage documents also specify that repayment of any existing principal is synchronized with sale of the asset subject to the mortgage.

16. A method of using a computer system for implementing a mortgage plan and for preparing one or more mortgage documents specifying payment obligations of a borrower to a lender concerning an asset which is subject to a mortgage, the mortgage plan specifying an equity participation mortgage obligation in which the lender receives a predetermined portion of realized appreciation in the asset during the life of the mortgage, comprising the steps of:
inputting data into the computer system regarding the terms of the mortgage, including the principal amount and an amortization period;
calculating annual average principal and periodic payment obligations of the borrower accruing under the mortgage obligation; and
preparing the one or more mortgage documents, the one or more mortgage documents specifying: the equity participation mortgage obligation; that the lender shares in a predetermined percentage of the realized appreciation on subsequent sale of the asset which is the subject of the mortgage; that timing of equity participation with the lender is indeterminable, occurs prior to the sale of the asset, and is controlled by the borrower; and that prior to sale of the asset, the amount of principal paid by the borrower pursuant to the mortgage substantially exceeds the amount of current interest paid by the borrower;

wherein the lender receives capital gain tax treatment on its portion of the realized appreciation of the asset upon the sale or transfer of the asset.

17. The method of claim 16, further comprising the steps of:

using the computer system to calculate the average mortgage principal outstanding during the amortization period; and using the computer system to prepare one or more mortgage documents which, upon sale of the asset, limit the lender's share of the realized appreciation of the asset to an Amortization Period Return.

18. The method of claim 17, wherein the mortgage documents do not specify a maturity date and the sale of the asset occurs after the amortization period has been completed, and further comprising the step of preparing the one or more mortgage documents to specify that the lender's share of the realized appreciation of the asset comprises the sum of the Amortization Period Return and a Post-Amortization Period Return.

19. The method of claim 17, wherein the lender's share of the realized appreciation of the asset comprises the lesser of: (1) a specified percentage of the total realized appreciation value; or (2) the sum of the Amortization Period Return and the Post-Amortization Period Return.

20. A method of using a computer system for implementing a mortgage plan and for preparing one or more mortgage documents specifying payment obligations of a borrower to a lender concerning an asset which is subject to a mortgage which need not have a maturity date, the mortgage plan specifying an equity participation mortgage obligation in which the lender receives a predetermined portion of realized appreciation in the asset during the life of the mortgage, comprising the steps of:

inputting data into the computer system regarding the terms of the mortgage, including the principal amount and the amortization period;

calculating annual average principal and periodic payment obligations of the borrower accruing under the mortgage obligation; and preparing the one or more mortgage documents, the one or more mortgage documents specifying: the equity participation mortgage obligation; that the lender shares in a predetermined percentage of the realized appreciation on subsequent sale of the asset which is the subject of the mortgage; that timing of equity participation with the lender is indeterminable, occurs prior to the asset sale or maturity date, if applicable, and is controlled by the borrower; and that prior to sale or transfer of the asset, the entire amount of the mortgage payments made by the borrower are applied to the principal amount.

* * * * *